Oct. 23, 1962     E. C. LINDSEY     3,059,515
BROACHING APPARATUS FOR MACHINING GROOVES
Filed Oct. 28, 1959     2 Sheets-Sheet 1
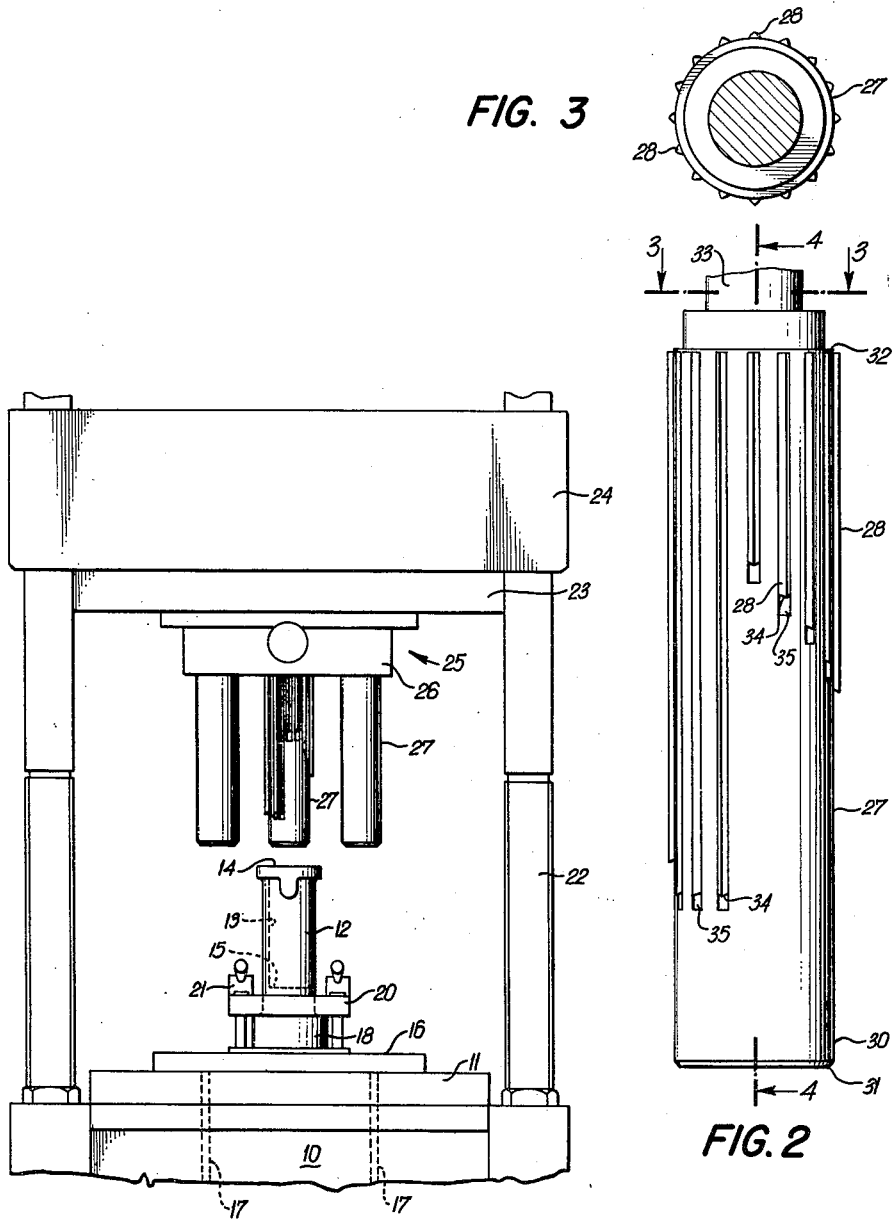
INVENTOR.
EDWARD C. LINDSEY

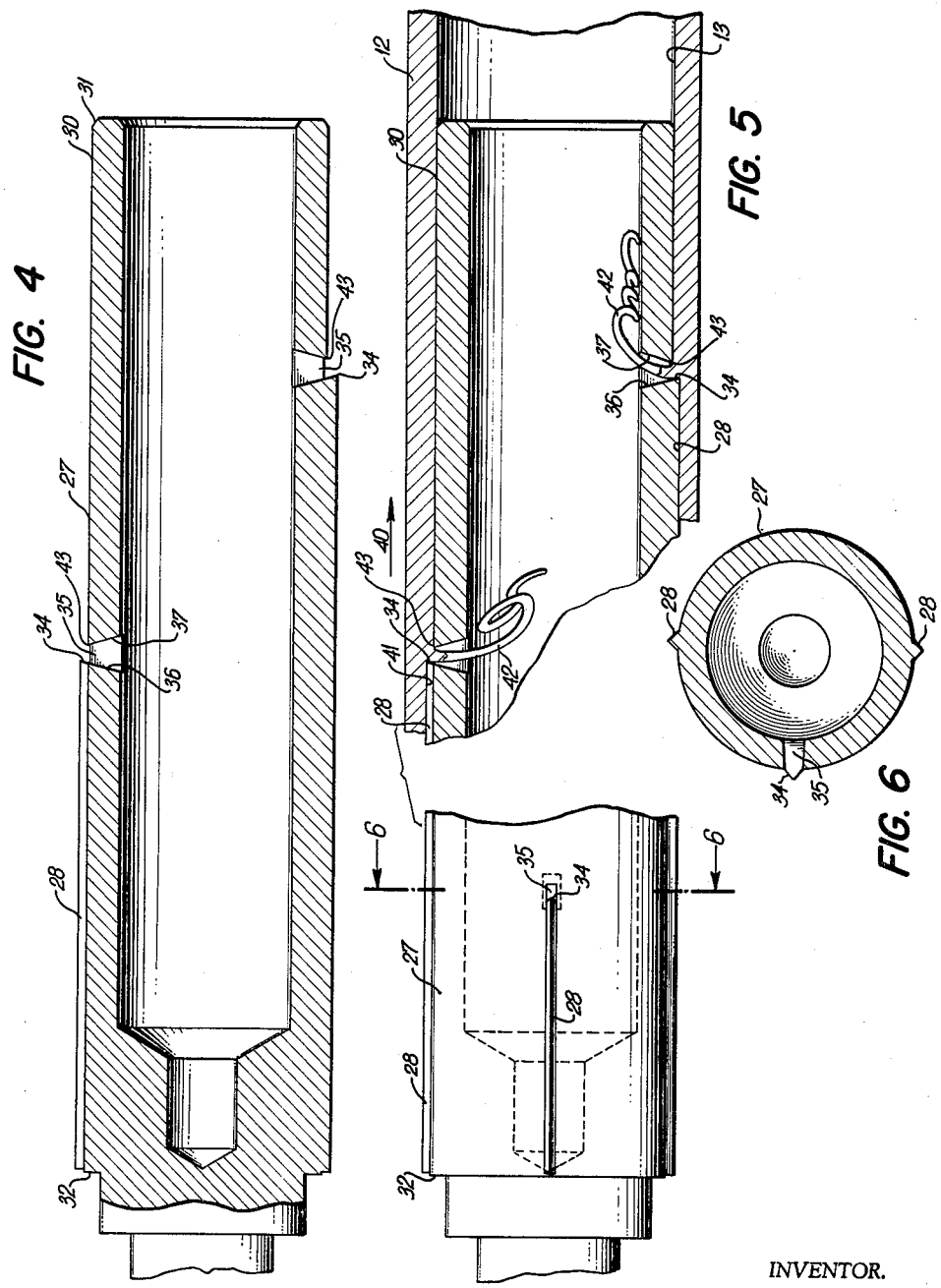

3,059,515
BROACHING APPARATUS FOR
MACHINING GROOVES
Edward C. Lindsey, La Mirada, Calif., assignor to The Sancor Corporation, El Segundo, Calif., a corporation of California
Filed Oct. 28, 1959, Ser. No. 849,297
2 Claims. (Cl. 83—5)

The present invention relates to a method and apparatus for machining elongated grooves in an internal bore of a workpiece and more particularly to a method and apparatus for cutting an elongated groove, collecting and storing a continuous groove chip and severing the chip from the workpiece at the end of the groove to provide a relatively clean and smooth termination.

In the past, it has been the conventional practice in the metal machining field to employ a single cutter to remove a chip from the internal bore of a workpiece to form an internal groove by passing a cutting tool through this bore in engagement with the wall of the bore so that a continuous elongated groove is effected which commences at one end of the workpiece and terminates at its opposite end. Usually, the chip cut from the workpiece to form the groove is permitted to fall or drop through the workpiece bore and generally, chip or groove termination does not present a problem since the cutter passes completely through the bore and the groove is continuous from one end of the workpiece to the other end. Sometimes, the free chips fall into other working parts of the machining apparatus which impedes the machining operation and sometimes the free chips are scattered over a wide area requiring time and effort for collection and disposal.

However, the need has arisen in the metal working field to machine a plurality of grooves in the inside wall of a workpiece, such as a cylinder, which does not extend the full length of the workpiece bore and wherein the plurality of grooves are of varying length respective to each other. The problem of cutting such grooves is complicated even further when the bore of the workpiece only partially passes through the cylinder so that a broaching tool can enter or exit through only one end of the workpiece. Under these circumstances, difficulties are encountered in chip collection, chip accumulation and storage, chip severance and contouring of the groove end.

These problems and difficulties are obviated by the method and apparatus of the present invention wherein a broaching tool is provided with at least one cutter disposed about its periphery for insertion into the workpiece bore so that the cutter or cutters engage desired regions of the workpiece wall from which the groove or grooves are to be formed. The cutter or cutters are of desired length and configuration to form the necessary groove. The broaching tool is hollow with an opening or aperture passing through the tool wall adjacent to and forward of the cutting edge or blade of the cutter which communicates with the hollow interior of the tool. The walls of each opening or aperture are divergent in cross-section from the exterior surface of the tool to the inner surface wall of the hollow so that a chip being cut by the cutter edge will enter the opening and be guided into the interior hollow of the tool for collection and accumulation. After the broach or tool is pushed to the proper depth, it is retracted. The wall of the opening opposite the groove cutting edge is provided with a chip cutting edge so that the end of the groove may be terminated upon the reversing of the direction of tool movement to remove or retract the tool from the bore so that the chip cutting edge will sever the chip from the cylinder wall to leave a relatively clean and smooth contour at the end of the groove. The chips collected in the hollow of the tool may be readily removed via an open end of the tool.

Therefore, it is a primary object of the present invention to provide a novel broaching tool for simultaneously cutting a plurality of elongated grooves in the bore of a workpiece terminating in a relatively clean and smooth contour at the end of each groove.

Another object of the present invention is to provide a novel broaching tool for simultaneously cutting grooves about the internal bore of a workpiece while collecting the cutting chips in a confined and restricted area followed by terminating the cut and thereby the groove in a relatively clean contour effected by the removal of the broaching tool from the workpiece bore.

Still a further object of the present invention is to provide a novel broaching tool for collection and accumulation of cutting chips during the cutting operation in a manner which does not interfere with the cutting operation nor other machinery or moving parts in close proximity to the cutting operation.

Still a further object of the present invention is to provide a novel broaching tool for terminating an extended or elongated cut by severing the chip from a workpiece to provide a relatively clean and smooth terminal region for the cut.

Still a further object of the present invention is to provide a novel broaching tool having a cutting edge for making a groove in the internal bore of a workpiece to form a continuous chip and a second cutting edge for severing the formed chip from the workpiece to leave a relatively clean contour at the end of the groove.

Another object of the present invention is to provide a broaching tool and a method of cutting a groove in a workpiece bore to provide a continuous elongated chip, confining and restricting the chip to a storage area and severing the elongated chip to complete and terminate the groove.

These and other objects of the present invention will be more readily understood with reference to the following description accompanying the drawings, wherein:

FIGURE 1 is a side view of a broaching press or apparatus having a plurality of broaches incorporating the present invention;

FIGURE 2 is an enlarged side view of a broach employed in the press of FIGURE 1;

FIGURE 3 is a top sectional view of the broach of FIGURE 2 taken in the direction of arrows 3—3;

FIGURE 4 is a longitudinal sectional view of the broach shown in FIGURE 2 taken in the direction of arrows 4—4;

FIGURE 5 is a side view, partly in section, of the broach of FIGURE 4 shown partially inserted into a workpiece bore showing a pair of cuts being taken in the workpiece bore; and FIGURE 6 is a sectional view of the broach of FIGURE 5 taken in the direction of arrows 6—6.

With reference to FIGURE 1, a broaching press or apparatus is shown which employs a base 10 on which is mounted a bottom bolster plate 11 for carrying and supporting a workpiece 12. In the present instance, the workpiece is shown in the form of a cylinder having an internal bore 13 extending from an open end 14 to a closed end or bore bottom 15. In some applications, the bore may be continuous from one end of the workpiece to its opposite end. For some workpiece forming operations, it has been found desirable to use a suitable coolant and therefore, the workpiece is shown mounted in a cooling pan 16 for receiving a suitable coolant via passages 17 extending through the base and the bottom bolster plate. The cylinder workpiece of FIGURE 1 is shown as having an enlarged lower portion 18 which is suitable for receiving a clamping bar arrangement 20 actuated by clamp handles 21 for engaging the enlarged portion of the cylinder to forcibly hold and retain the cylinder in proper position for the broaching operation.

It is the intent of the present invention to machine or cut one or a plurality of grooves in the internal surface of the cylinder wall wherein the grooves do not extend the full longitudinal length of the cylinder bore and therefore, means are required for terminating groove cut from the cylinder wall and for severing the chip. It should also be appreciated that the shape or contour of the workpiece or the bore in the workpiece is not a criticality of the present invention and that any size, shape or form of workpiece, other than a cylinder, is adapted to be grooved by the present invention.

Extending upward about the base and bottom bolster plate and located about the outer dimension of the base, there is provided four upright tie rods 22 for slidably mounting an upper bolster plate 23 and a vertically travelling frame 24. The bolster plate is suitably secured to the underside of the frame and is arranged to carry a revolving turret assembly shown in the direction of the general reference numeral 25. The travelling frame is arranged to slide vertically on the tie rods under the force of a hydraulic ram arrangement (not shown) generally located above the frame.

The turret assembly comprises, in general, a rotatable table 26 from which one or more broaching tools 27 are suspended. Each tool is detachably connectable with the underside of the turret assembly table and the table may be rotated so that the relative position of a broaching tool may be selectively changed at will with respect to the workpiece 12 mounted on the upper surface of the lower bolster plate 11.

Inasmuch as the bolster press per se is not a part of the present invention, it is necessary only to appreciate that the press includes a base on which the workpiece is mounted having upright tie rods upon which a sliding frame carries a turret assembly of broaching tools into and out of engagement with the workpiece. The broaching tools are urged into engagement with the workpiece by a hydraulic ram arrangement and retraction of the broaching tool from the workpiece is similarly effected. Any suitable horizontal or vertically actuating press may be employed.

As shown in FIGURES 2 and 3, a broaching tool 27 is shown in accordance with the present invention which is of the general configuration of the cylinder bore 13 into which the broaching tool is to be forcibly inserted. Disposed about the periphery of the tool 27, there is provided a plurality of cutters 28 which are suitably shaped to provide a desired contoured groove in the inner wall surface of the cylinder workpiece 12. The cutters are also of selected length so as to provide grooves in the cylinder walls of desired length. The lower end 30 of the tool is provided with a chamfer 31 which serves as a guide for insuring the proper alignment of the broaching tool with the bore of the cylinder upon actuation of the hydraulic ram to advance the broaching tool toward the workpiece. The other end or the upper end 32 of the broaching tool is shown attached to a connecting rod 33 detachably connecting each broach to the turret assembly table 26. Each cutter 28 is provided with a cutting edge or blade 34 which appears on the forward end of the cutter. The depth of the cut to be taken in the cylinder wall is solely dependent upon the height of the cutter from the cutting edge to the exterior surface of the broaching tool.

The broaching tool is hollow having a relatively thick wall and may be arranged to close off end 30 or arranged to have end 30 open-ended as shown. Adjacent to and forward of the cutting edge 34 of each cutter and extending through the wall thickness of the broaching tool, there is provided an opening or aperture 35 which communicates the hollow of the tool with the exterior of the broaching tool and the forward cutting edge 34 of the cutter.

With respect to FIGURE 4, opening 35 is more clearly shown extending through the broaching tool wall into the hollow thereof. It is noted that the walls or surfaces 36 and 37 defining the hole 35 are divergent from the outer periphery of the tool toward the hollow and that cutting edge 34 is associated with wall 36 which slants from the cutting blade 34 towards end 32 of the broaching tool while wall 37 slants from the exterior surface of the broaching tool towards end 31. This arrangement of divergent walls 36 and 37 permits the directing of a chip cut by cutter edge 34 from the wall of the cylinder workpiece to be directed and guided through opening 35 into the interior hollow of the broaching tool.

As shown more clearly in FIGURE 5, the forward end 30 of the broaching tool has been inserted into the bore 13 of a workpiece 12 in the direction of the arrow 40 so that the cutters 28 engage the wall of the cylinder in a manner to effect a cut by means of cutting blade 34 associated with each cutter to form a groove 41 in the cylinder wall. A chip 42 removed from the cylinder wall in order to form the groove 41, is directed into the hollow of the broaching tool where collection and accumulation can occur without endangering or hampering the cutting operation or damaging of any working parts of the broaching press.

At the end of the forward stroke of the broaching tool in the direction of arrow 40, the grooves of a desired length have been cut and the broaching tool is moved in a direction opposite to arrow 40 to retract the broaching tool from the cylinder workpiece. At this time, chip severance from the wall of the internal cylinder bore is effected by a cutting edge 43 which is located beneath the cutting edge 34 and which is associated with wall or surface 37 of hole 35. It is a feature of the present invention that the severance of the chip by blade 43 achieves a relatively clean and smooth groove ending in the cylinder wall.

To provide relatively deep grooves in the bore of a cylinder, a plurality of broaching tools may be employed wherein all the cutters on a first tool are of the same height so that a small cut or bite is taken in the cylinder workpiece wall followed by the insertion of a series of broaching tools wherein the cutters of each broaching tool of the series are progressively higher in height so that the cut in the cylinder workpiece wall is deepened as additional broaching tools of the series are inserted and retracted.

In actual operations, a workpiece 12 such as a cylinder is clamped into position on a base 10 of a suitable press in proper alignment with a first broaching tool of a series which are mounted on a turret assembly 25. Under high pressure, the broaching tool 27 is advanced towards the workpiece so that the forward end 30 of the broaching tool mates with the bore 13 of the workpiece 12 in optical alignment. As the broaching tool advances into the bore, the broaching tool cutters 28 engage with the wall of the workpiece so that cutting blade 34 commences to remove a portion of the cylinder wall to provide a groove 41 in the inner surface of the wall.

As shown in FIGURE 5, that portion of the cylinder wall removed by the cutter 28 is chip 42 and is directed into the hollow of the broaching tool by the inclined wall 36 associated with hole 35. The incline of wall 36 is in alignment with the cutting edge 34. Furthermore, the chip is directed into the hollow since there is no other space available for chip accumulation or storage.

When the broaching tool has progressed to the extent of desired groove cutting, the forward broaching tool action is reversed with respect to the direction shown by arrow 40 and cutting edge 43 effects the severance of the chip from the cylinder wall and provides for a smooth clean groove ending. The effectiveness of the groove ending and of the chip severance is due to the slanted wall 37 extending in a direction from the exterior surface of the broaching tool toward the forward end 30 of the tool.

Upon the completion of broaching tool retraction from bore 13 of cylinder workpiece 12, a deeper cut may be taken by repeating the above process employing a broaching tool having cutters 28 of greater height than the preceding cutters so that a deeper cut may be taken. This may be easily achieved by revolving the turret assembly on the press and repeating the process.

Once the broaching tool has been removed from the workpiece, it is an easy matter to remove the chips from the interior of the tool hollow in the event end 30 is closed or chip removal may be effected by collecting the chips from the bottom of bore 13 in the workpiece in the event the end 30 of the broaching tool is open. However, it should be appreciated that the broaching tool may be employed in a horizontal plane in which case all chips would be retained within the hollow of the broaching tool even though end 30 of the tool is provided with an opening.

Various modifications of the present invention may be made by those skilled in the art without departing from the spirit and scope of the invention as hereinafter defined by the appended claims.

I claim:

1. In a press, a broach for cutting material from a workpiece comprising, a thick-wall casing having a central bore of uniform diameter, at least one elongated cutter provided on the exterior surface of the casing extending from one end of the casing towards its opposite end, the forward end of the cutter having a first cutting blade on the extreme end of the cutter terminating in a first wall leading to the exterior surface of the casing, the casing having an opening adjacent the first wall communicating the central bore with the exterior surface of the casing whereby material cut from the workpiece is directed into the central bore for accumulation, and a second cutting blade located from the center of said bore at a radial distance less than that of said first cutting blade defined by the edge of the opening at the exterior surface of the casing and a second wall opposite to the first wall, the second cutting blade adapted to sever the material cut from the workpiece.

2. The invention as defined in claim 1 wherein the opening in the casing includes a pair of opposing surfaces which diverge from the exterior surface of the casing towards the central bore of the casing and wherein one surface joins with the first cutting edge of the cutter and the other surface leads from the second cutting edge to the central bore.

References Cited in the file of this patent

UNITED STATES PATENTS

| Re. 20,439 | Rippel | July 6, 1937 |
| 591,871 | McCool | Oct. 19, 1897 |
| 1,327,881 | Roth | Jan. 13, 1920 |
| 1,482,110 | Bolesky | Jan. 29, 1924 |
| 1,549,309 | Howe | Aug. 11, 1925 |
| 1,681,018 | Stephan | Aug. 14, 1928 |
| 2,525,098 | Hougland | Oct. 10, 1950 |
| 2,896,310 | Young | July 28, 1959 |

FOREIGN PATENTS

| 82,228 | Germany | July 20, 1895 |